United States Patent [19]

Takahashi

[11] Patent Number: 5,165,016
[45] Date of Patent: Nov. 17, 1992

[54] IMAGE DATA OUTPUT APPARATUS WITH DISPLAY RANGE DESIGNATION MEANS

[75] Inventor: Tetsuji Takahashi, Musashimurayama, Japan

[73] Assignee: Casio Computer Co., Ltd., Tokyo, Japan

[21] Appl. No.: 469,792

[22] Filed: Jan. 22, 1990

Related U.S. Application Data

[63] Continuation of Ser. No. 270,399, Nov. 9, 1988, abandoned, which is a continuation of Ser. No. 913,344, Sep. 29, 1986, abandoned.

[30] Foreign Application Priority Data

Oct. 7, 1985 [JP] Japan .............................. 60-223066

[51] Int. Cl.⁵ .............................................. G06F 3/14
[52] U.S. Cl. .................................. 395/165; 364/237.2; 364/246.7; 364/246.3; 364/237.3; 364/DIG. 2; 395/600; 395/155
[58] Field of Search ............... 395/100, 250, 600, 155, 395/165; 340/747, 720, 721, 723, 725, 731, 735, 734

[56] References Cited

U.S. PATENT DOCUMENTS

| | | | |
|---|---|---|---|
| 4,110,823 | 8/1978 | Cronshaw | 364/200 |
| 4,267,573 | 5/1981 | Chaikin et al. | 364/518 |
| 4,276,570 | 6/1981 | Burson | 340/725 |
| 4,414,628 | 11/1983 | Ahnja et al. | 364/200 |
| 4,513,374 | 4/1985 | Hooks, Jr. | 364/200 |
| 4,549,275 | 10/1985 | Sukonick | 340/725 |
| 4,580,134 | 4/1986 | Campbell | 340/725 |
| 4,580,782 | 4/1986 | Ochi | 340/725 |
| 4,641,255 | 2/1987 | Hohmann | 364/518 |
| 4,688,167 | 8/1987 | Agrawal | 340/747 |
| 4,689,616 | 8/1987 | Goude | 340/725 |
| 4,692,757 | 9/1987 | Tsuhara et al. | 340/721 |
| 4,694,288 | 9/1987 | Harada | 340/721 |
| 4,695,964 | 9/1987 | Seto et al. | 364/518 |
| 4,700,320 | 10/1987 | Kapur | 364/521 |
| 4,713,779 | 12/1987 | Graciotti et al. | 364/518 |
| 4,766,427 | 8/1988 | Abe | 340/721 |
| 4,774,506 | 9/1988 | Bossoutrout | 340/721 |
| 4,785,296 | 11/1988 | Tabata | 340/721 |
| 4,786,897 | 11/1988 | Takanashi | 340/721 |
| 4,823,108 | 4/1989 | Pope | 340/721 |
| 4,845,653 | 7/1989 | Conrad | 395/155 |
| 4,859,999 | 8/1989 | Koso | 340/799 |
| 5,101,365 | 10/1988 | Westberg | 395/165 |

FOREIGN PATENT DOCUMENTS

58-150137 9/1983 Japan .
61-29512 7/1986 Japan .

*Primary Examiner*—Thomas C. Lee
*Assistant Examiner*—Eric Coleman
*Attorney, Agent, or Firm*—Frishauf, Holtz, Goodman & Woodward

[57] ABSTRACT

An image data output apparatus including a page-link memory, for storing data pertaining to the relationship between the logical address and the physical address, of the image data, and an address-translation unit for translating logical page addresses into physical page addresses. The apparatus can perform quick, accurate accessing of the image data, in a direction across the adjacent pages. The frame memory can undergo reallocation, so that the least possible data is transferred upon generation of the boundary condition of a frame memory.

4 Claims, 11 Drawing Sheets

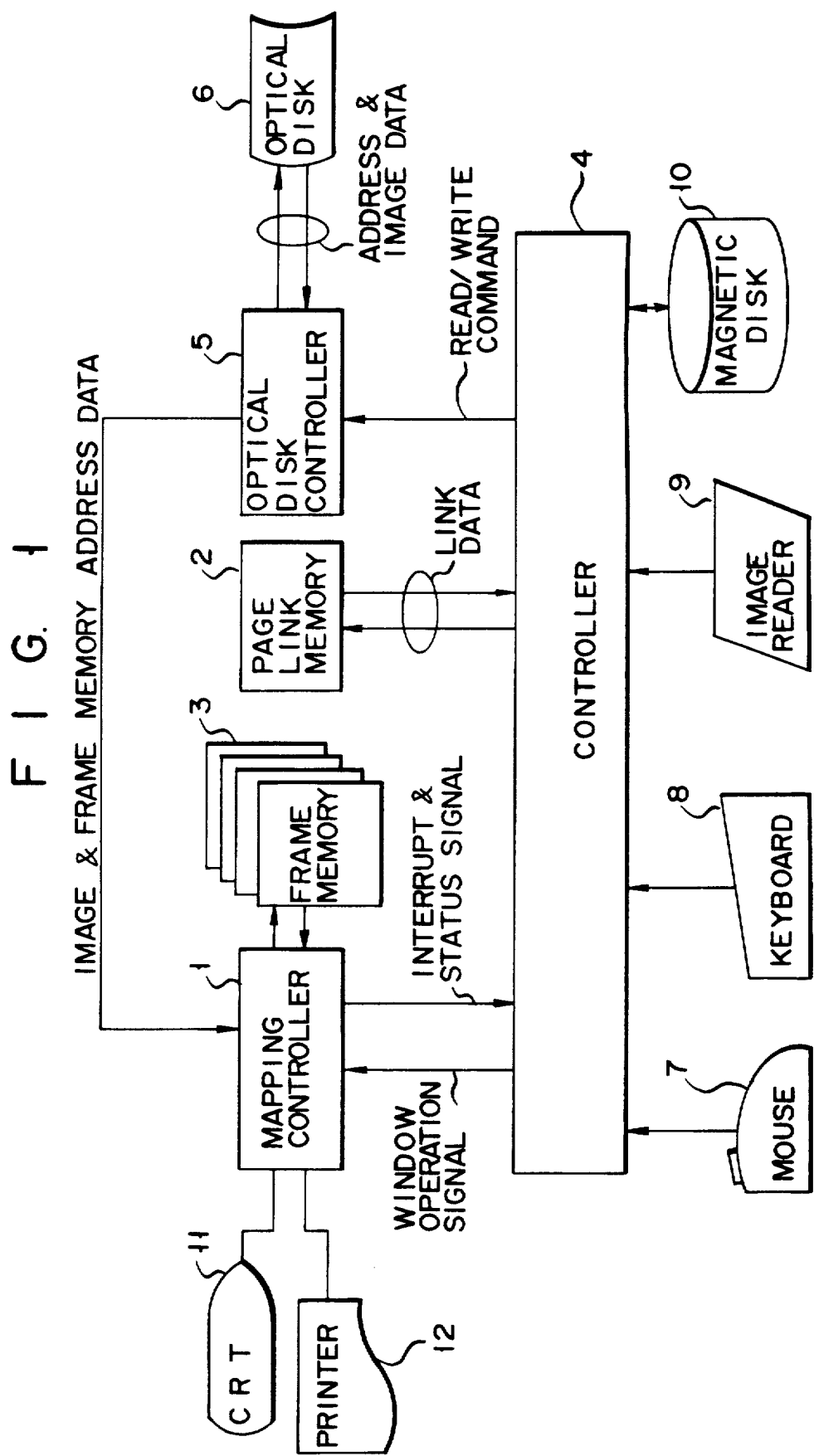

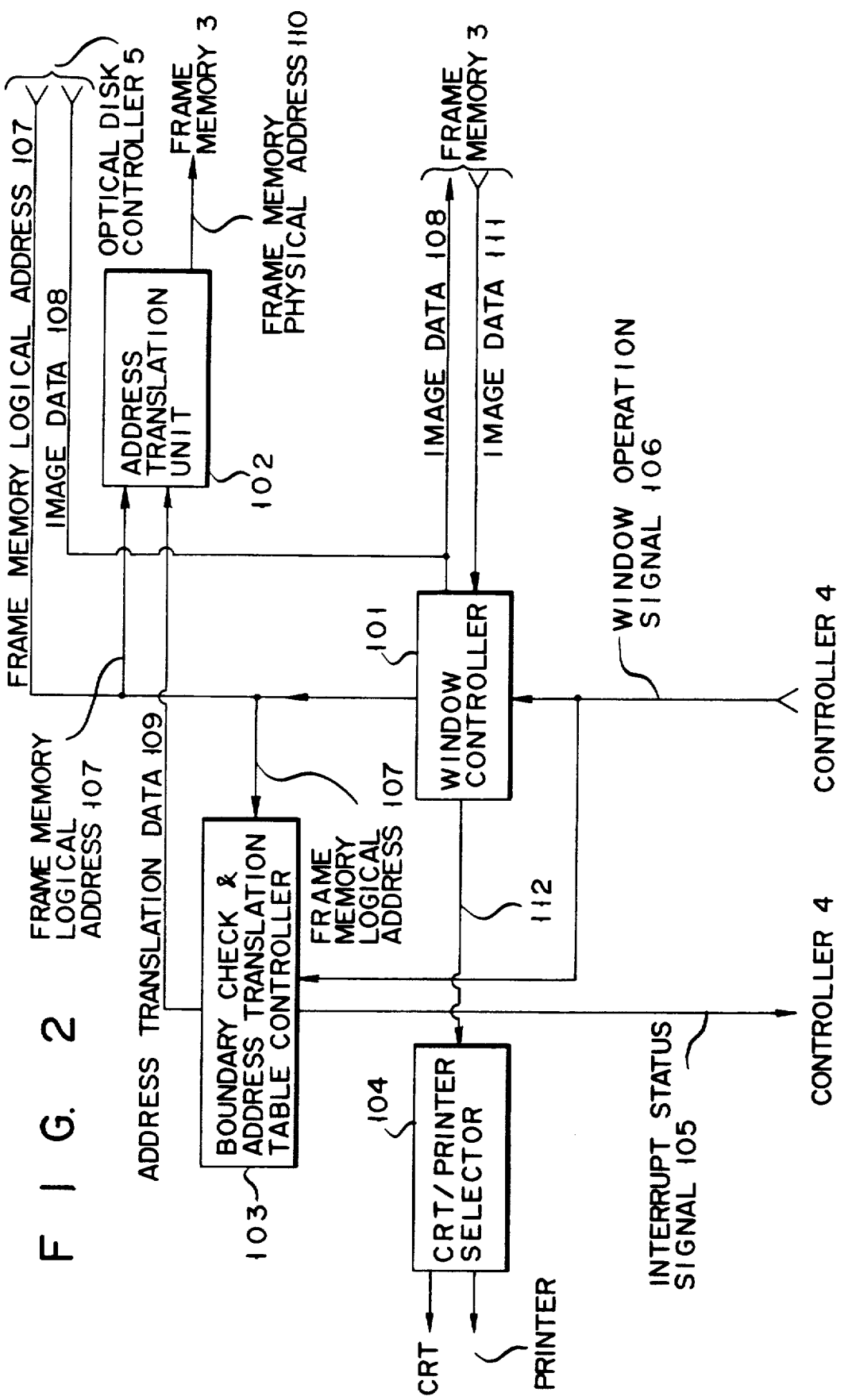

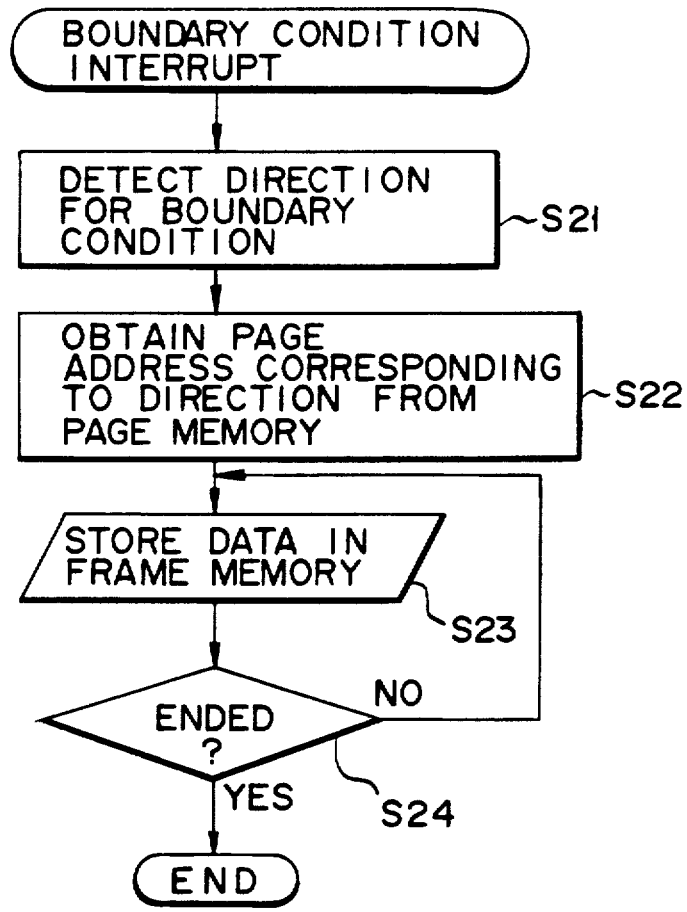

FIG. 7A

| FRAME MEMORY PHYSICAL PAGE ADDRESS | FRAME MEMORY LOGICAL PAGE ADDRESS |
|---|---|
| m1 | L1 |
| m2 | L2 |
| m3 | L3 |
| m4 | L4 |

FIG. 7B

| FRAME MEMORY PHYSICAL PAGE ADDRESS | FRAME MEMORY LOGICAL PAGE ADDRESS |
|---|---|
| m1 | L3 |
| m2 | L4 |
| m3 | L1 |
| m4 | L2 |

F I G. 8
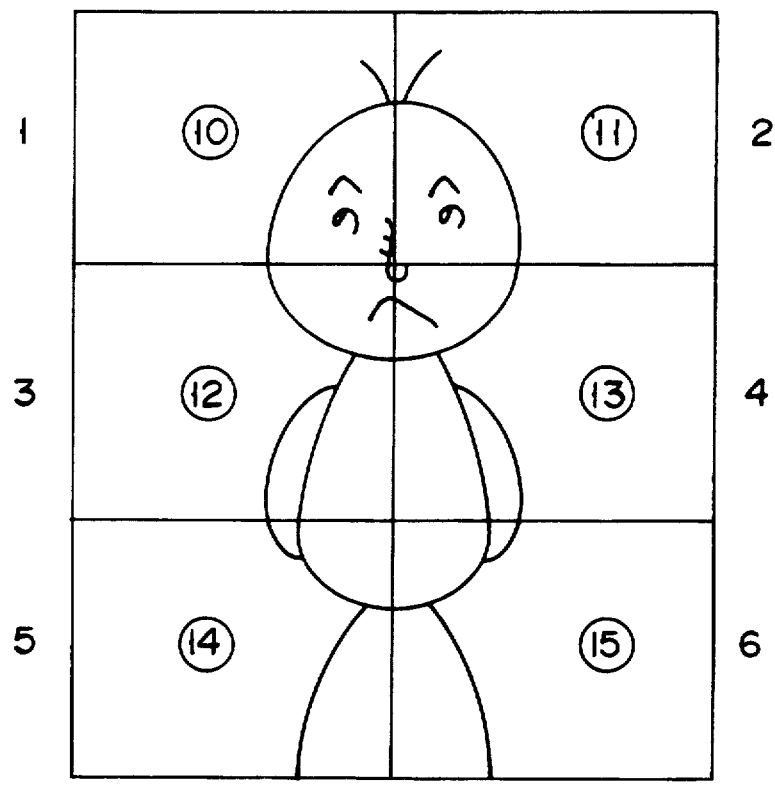

1

IMAGE DATA OUTPUT APPARATUS WITH DISPLAY RANGE DESIGNATION MEANS

This application is a continuation of application Ser. No. 07/270,399, filed Nov. 9, 1988, now abandoned, which in turn is a continuation of Ser. No. 06/913,344 filed Sep. 29, 1986, now abandoned.

BACKGROUND OF THE INVENTION

The present invention relates to an image data output apparatus for accessing image data representing an image area crossing adjacent pages, and displaying and/or printing it, to output an image. The image data output apparatus can be used effectively in an electronic file system or the like.

In a conventional electronic file system capable of displaying and/or printing image data such as a map and a picture, many pieces of image data are stored in a disk system such as an optical disk system, each image data representing a page corresponding to one frame. The stored data is read out and edited as required.

In such a conventional system using an optical disk apparatus, image data is input/output in units of pages (a one-frame image is recorded in one track, and an address is assigned to each track and is accessed to input or output data), as is shown in Japanese Patent Disclosure (Kokai) No. 58-150137 (disclosed on Sep. 6, 1983).

To output a large image crossing adjacent pages, such as a map, all portions of the large image must be displayed or printed. This is impossible. Therefore, pages associated with the large image are printed as hard copies, and these copies are cut to extract associated portions. These portions are then adhered to each other to form the large image. The user must always pay attention to the units of pages, when operating the conventional image data output apparatus. Hard copies include wasteful portions. Necessary portions of the hard copies must be adhered together by means of glue or the like.

Japanese Patent Disclosure (Kokai) No. 55-57936 (disclosed on Apr. 30, 1980) discloses an image data output apparatus having a CRT memory for storing image data of one or more frames, to display a large image (e.g., a map) which cannot be displayed as a one-frame image on the CRT screen. The display screen is scrolled in any direction, to observe a desired portion. However, a screen to be scrolled, in order to cover a wide area on the CRT display device, is not preferable since the memory capacity must then be increased.

In order to avoid increasing the memory capacity in the CRT display device, it is detected in advance that a display area has reached the end of the CRT screen, while the display area is being shifted, and then the memory blocks are reallocated. The image data is supplied from a computer to the reallocated CRT memory, so that an image in the moving direction can be observed.

However, if a storage medium, such as an optical disk for storing image data in units of pages (in units of frames) is used, and such data is read out or written therein, it is difficult to achieve accurate, arbitrary, high-speed accessing of image data representing an area crossing adjacent pages.

SUMMARY OF THE INVENTION

It is an object of the present invention to provide an image data output apparatus for performing accurate and high-speed display and/or printing, to output image data representing an image crossing pages in accordance with a connecting relationship between adjacent pages.

It is another object of the present invention to provide an image data output apparatus wherein an image can be output at high speed by transferring the least possible image data, even if image data to be output is not stored in a frame memory.

In order to achieve the above objects of the present invention, there is provided an image data output apparatus comprising: image data storage means for storing image data; image output means for displaying and/or printing, to represent the image data; window-designating means for designating an area whose image data is to be represented by the image output means, among image data stored in the image data storage means; page-connecting data storage means for storing data pertaining to the relationship between the position data, in the entire image to be output, of the image data stored in said image data storage means and the physical address data of the image data stored in said image data storage means; a frame memory for temporarily storing the image data of one or more pages; mapping-managing means for managing an address relationship between the image data, output by the image output means, and the image data temporarily stored in the frame memory; mapping-updating means for discriminating whether the image data output by the image output means is stored in the frame memory when an output area is updated by the window-designating means, and for updating the relationship managed by the mapping-managing means, on the basis of the discrimination result; and control means for accessing the page-connecting data storage means, on the basis of the discrimination result of the mapping-updating means, for reading out image data, which is not stored in said frame memory and which is also to be output by the image output means, from the image data storage means, and for storing the output image data in the frame memory.

BRIEF DESCRIPTION OF THE DRAWINGS

Other objects, features, and advantages of the present invention will become apparent from the following description, taken in conjunction with the accompanying drawings, in which:

FIG. 1 is a diagram showing the overall system configuration according to an embodiment of the present invention;

FIG. 2 is a block diagram of mapping controller 1 in FIG. 1;

FIG. 6B is a flow chart for explaining the operation of controller 4 when the boundary condition signal is generated;

FIGS. 7A and 7B are respectively conversion tables between physical page addresses and logical page addresses of frame memory 3; and FIG. 8 and FIGS. 9A, 9B, 9C, and 9D are respectively views for explaining the operations in FIGS. 1 and 2.

DETAILED DESCRIPTION OF THE PREFERRED EMBODIMENTS

Figure 3A:
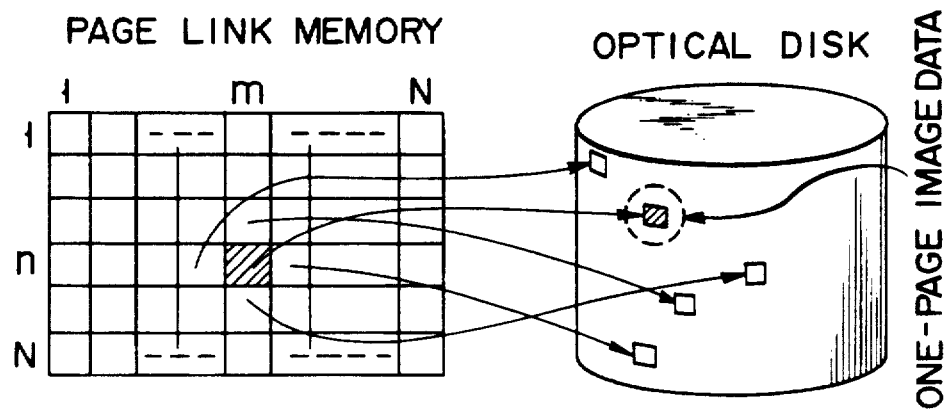
FIGS. 3A and 3B are respectively views for explaining page-link memory 2.

Referring to FIG. 1, controller 4 is connected to mouse 7, keyboard 8, image reader 9, magnetic disk 10, optical disk controller 5, page-link memory 2, and mapping controller 1. Mouse 7 is used to perform image editing and to scroll the window. Keyboard 8 is used to input a name for identifying image data and to interrogate the system. Image reader 9 is used to input image data. An image data directory, page-link data, and system control programs, etc. are stored on magnetic disk 10. Controller 5 is connected to optical disk 6. Image data is stored on disk 6. Mapping controller 1 is connected to controller 4, optical disk controller 5, frame memory 3, CRT 11, and printer 12, and dynamically assigns image data from disk 6 to memory 3. Controller 1 also performs mapping control for determining which portion of image data in memory 3 is to be output to CRT 11 or printer 12. Controller 1 further performs boundary condition control and image data editing control.

FIG. 2 is a detailed arrangement of mapping controller 1. Window controller 101 receives window-operation signal 106 from controller 4, and outputs frame memory logical address 107, with respect to the window, to address-translation unit 102, and exchanges image data 108 and 111 with memory 3. Controller 101 also outputs the image data and device-select signal 112 to CRT/printer selector 104. Image data is displayed on CRT 11 or is printed, using printer 12. Unit 102 translates frame memory logical address 107, from controller 5 or 101, into frame memory physical address 110. The output address signal from unit 102 is supplied to memory 3. Boundary-check and address-translation table controller 103 receives window-operation signal 106 and frame memory logical address 107 from controller 5 or 101, and checks the boundary condition of the window. Controller 103 outputs address-translation data 109 to unit 102, based on the checked condition, thereby performing dynamic reallocation of the frame memory physical/logical page address-conversion table. Controller 103 also supplies interrupt/status signal 105 to controller 4.

Figure 3B:
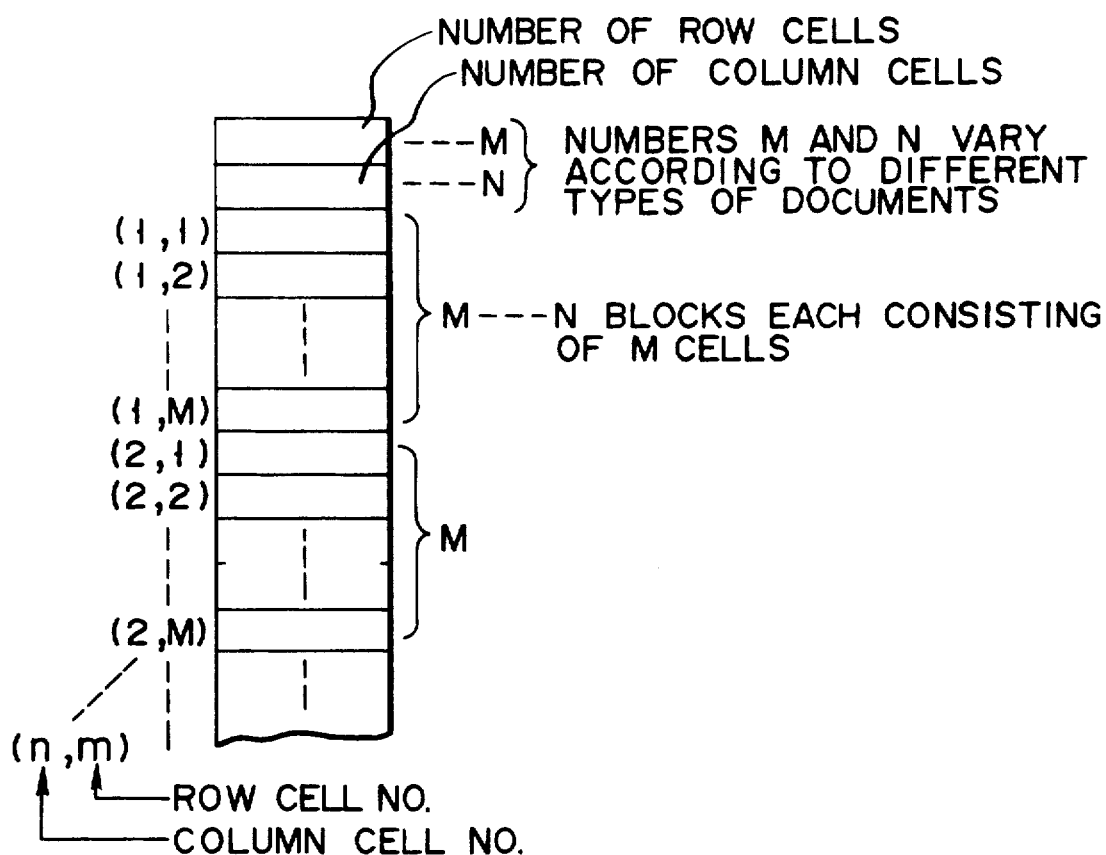
Figure 4:
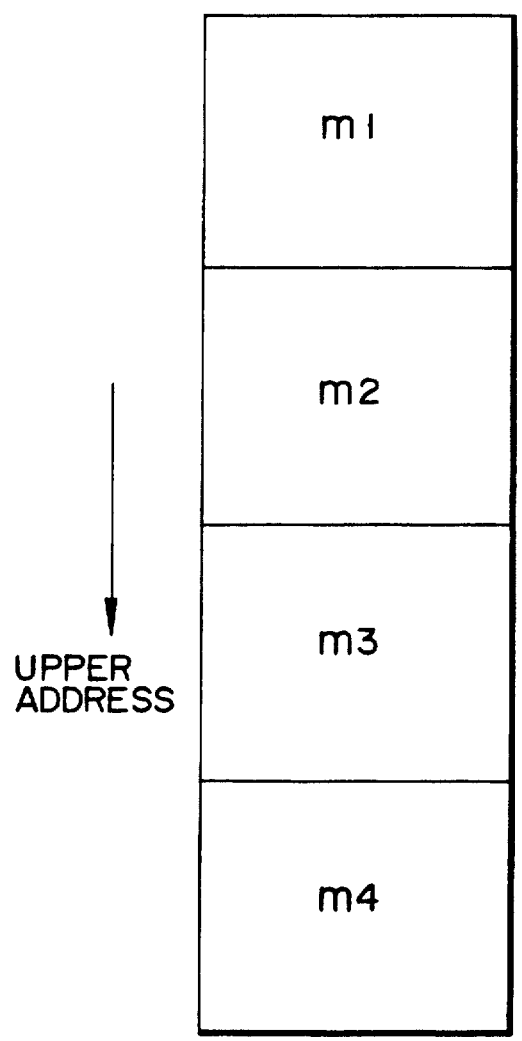
FIG. 4 is a view for explaining a physical page address format of frame memory 3.

With the above arrangement, page-link memory 2 stores data pertaining to the two-dimensional connection relationship between the pages of image data, in the form of matrix, to present the image data crossing a plurality of pages. Data in each cell of the matrix indicates one-page image data, and stores the corresponding physical page address of the one-page image data, on optical disk 6. The memory area of page-link memory 2, having the structure shown in FIG. 3A, is actually allocated as a continuous area, as is shown in FIG. 3B. Frame memory 3 stores four-page image data and has fixed physical page addresses m1 to m4, as is shown in FIG. 4.

Figure 6A:
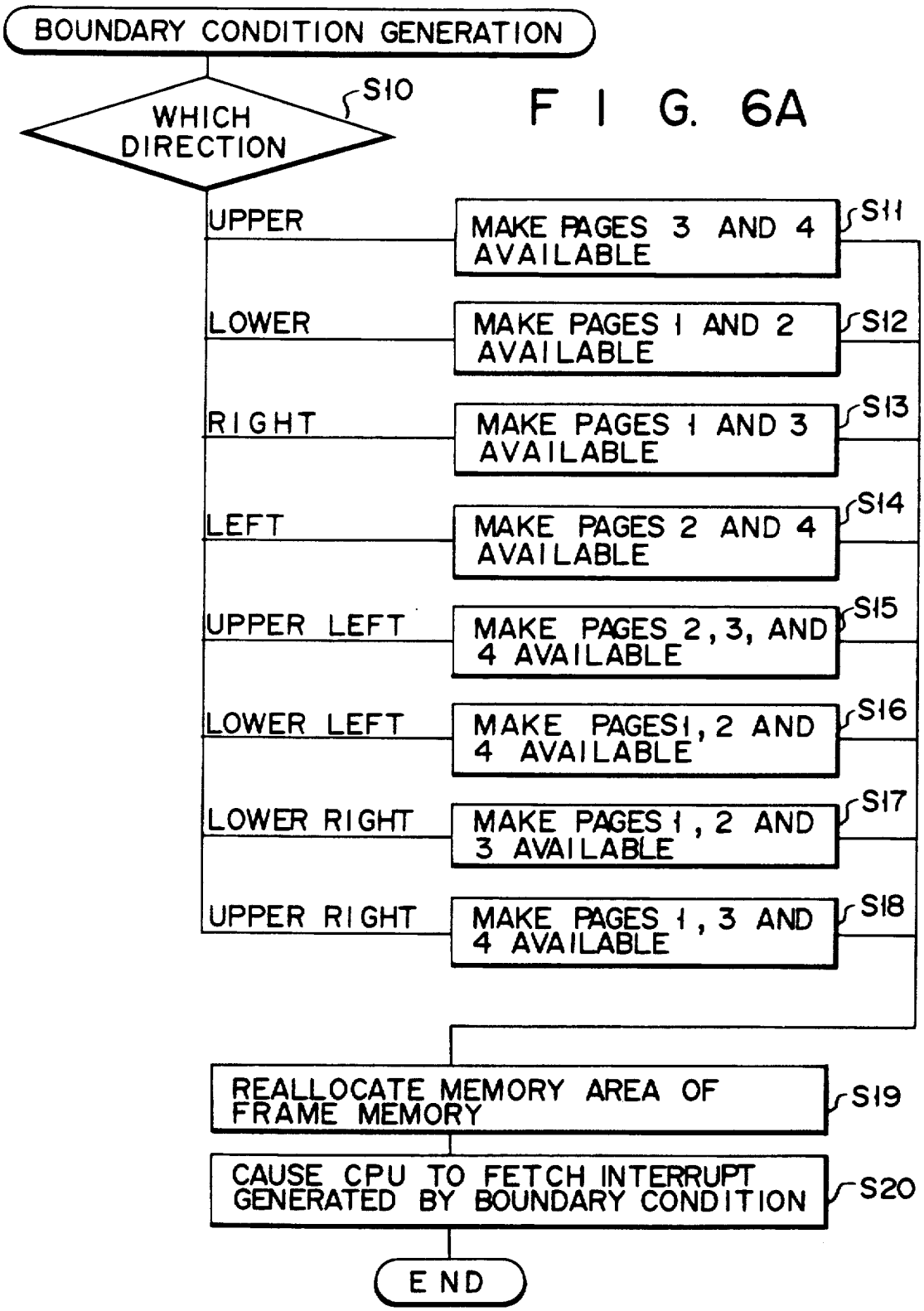
FIG. 6A is a flow chart for explaining the operation of mapping controller 1 when a boundary condition signal is generated.

The operation of the image data output apparatus having the arrangement described above will now be described with reference to the flow charts of FIGS. 6A and 6B and the views of FIGS. 7A to 9D. The frame memory logical and physical page addresses will be explained first.

The frame memory logical page addresses are page addresses actually used to display image data on CRT 11 and to print it, using printer 12, and they have a two-dimensional structure. In this embodiment, these addresses are of four pages. The upper left address space represents the L1 page; the upper right address space, the L2 page; the lower left address space, the L3 space, and the lower right space, the L4 page. Any image data for one page is output on CRT 11 or via printer 12. The addresses of the image data at the logical addresses are called the frame memory logical addresses. On the other hand, the frame memory physical addresses are the actual page addresses with respect to memory 3, as shown in FIG. 4. In this embodiment, the physical page addresses are the m1 page to the m4 page, as described above. In this case, the addresses of the image data in the physical page are called the frame memory physical addresses. In this embodiment, addresses m1 to m4 must be respectively assigned with addresses L1 to L4. This assignment is performed by the frame memory physical/logical page address-conversion table in address translation unit 102 (FIG. 2). At the time of initialization, the addresses are assigned, as is shown in FIG. 7A.

Figure 5A:
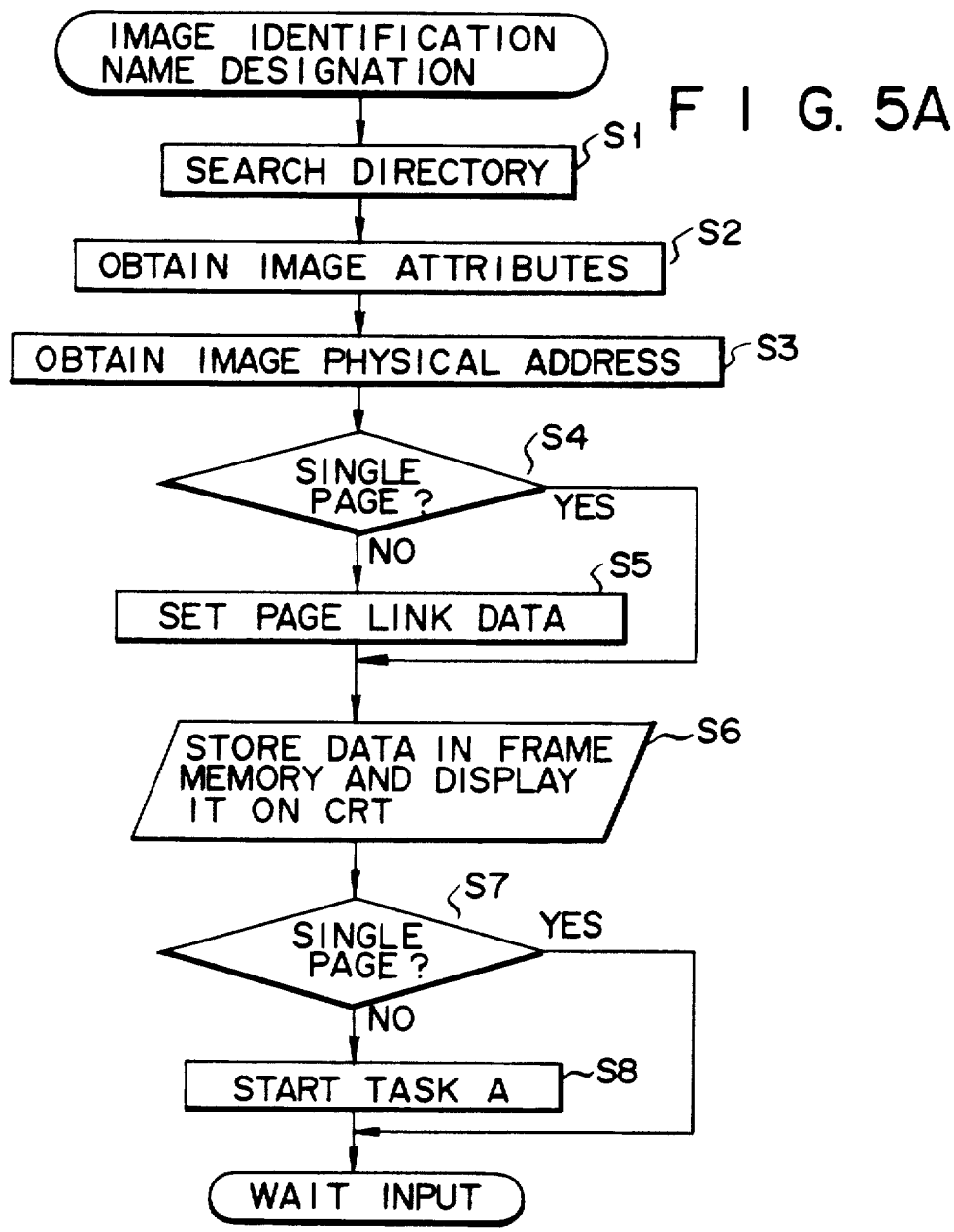
FIGS. 5A and 5B are respectively flow charts for explaining image data access.
Figure 5B:
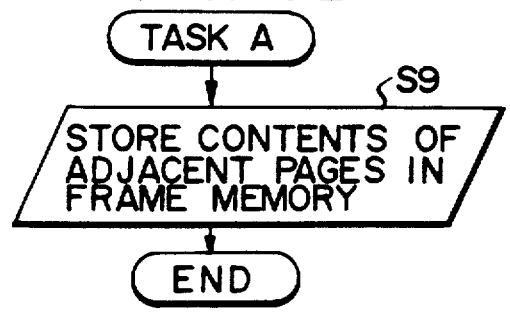

FIGS. 5A and 5B are respectively flow charts for explaining image data-accessing. When an operator designates an image data identification name, using keyboard 8, controller 4 searches directory data in magnetic disk 10 (S1), in order to obtain attribute data of the image data and page-link data (i.e., its physical address) (S2 and S3). Controller 4 then determines, according to the attribute data, whether the image data comprises image data for one pate or a plurality of pages (S4). If controller 4 determines, in step S4, that the image data consists of image data for a plurality of pages, the page-link data is set in page-link memory 2 (S5). The "plurality of pages" here means that each block corresponds to one page, for example, when a large map is divided into blocks in a matrix form, but is not overlaid, such as a book. Subsequently, one-page image data is read out from optical disk 6, by means of controller 5, and is written into memory 3, as image data 108. In this case, frame memory logical address 107 is output simultaneously with image data 108, to designate addresses in logical page address L1. At the time of initialization, each address in address L1 is converted into address 110 in address m1, by unit 102, as is shown in FIG. 7A, thereby designating a corresponding physical address of memory 3. In this case, first-page image data 108 is displayed on CRT 11, via window controller 101 and CRT/printer selector 104. If controller 4 determines that image data consists of a plurality of pages, the operator can designate a specific page instead of the first page. Controller 4 then determines, in step S7, whether the image data consists of a plurality of pages. If YES in step S7, task A in FIG. 5A is initiated as sub task (S8), and controller 4 waits an input. However, if controller 4 determines that the image data consists of a single page, it waits an input. Task A, started in step S8 in FIG. 5A, accesses page-link memory 2, and image data of the remaining adjacent pages is buffered in memory 3 (S9), thereby completing task A. In this case, frame memory logical address 107, output from optical disk controller 5, is an address of addresses L2 to L4. The address is translated into frame memory physical address 110 by address translation unit 102 according to the assignment relationship in FIG. 7A.

Assume that the page-link relationship of physical pages (10) to (15) in optical disk 6, as shown in FIG. 8, is written in cells 1 to 6 of page-link memory 2 according to the operation described above. Controller 1 buffers image data of pages corresponding to cells 1, 2, 3, and 4 in memory 2, stored in disk 6, according to task A of FIG. 5B, in logical page addresses L1, L2, L3, and L4 of the frame memory in the initial state. Referring to FIG. 7A, the image data is respectively written at physical page addresses m1, m2, m3, or m4 in frame memory 3.

Figure 9A:
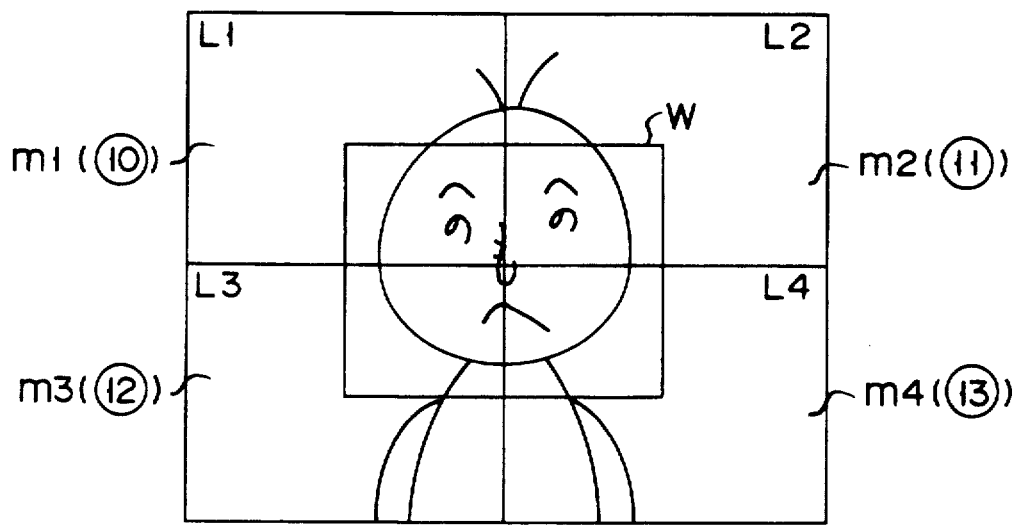

Window control operation will be described below. The operator can use mouse 7 to designate a window for a page as a CRT or printer output area over an image data at the logical page addresses L1 to L4 of frame memory 3. More specifically, the logical address image in frame memory 3 is stored, as is shown in FIG. 9A, in accordance with the operation described above. Image data at physical address m1 of memory 3 and stored in the 10 th page of optical disk 6, are stored at logical page address L1; m2 ( ⑪ ), in L2; m3 ( ⑫ ), in L3; and m4 ( ⑬ ). in L4. When the operator moves mouse 7, controller 4 supplies window-operation signal 106 to window controller 101 in mapping controller 1. Controller 101 supplies address 107 of an area (to be referred to as a window hereinafter) represented by W of FIG. 9A, to address translation unit 102, thereby reading out corresponding image data 111 from memory 3. Image data of the area represented by window W of FIG. 9A can be displayed on CRT 11 or printed, using printer 12. Mouse 7 can be selectively moved in any direction, to arbitrarily designate an output area within the image data of the L1 to L4 pages. Image data represented in an area crossing the pages can be arbitrarily output. The area of window W is normally one page but can be set to be an area smaller than one page.

The operation for generating a boundary condition will be described hereinafter.

Figure 9B:
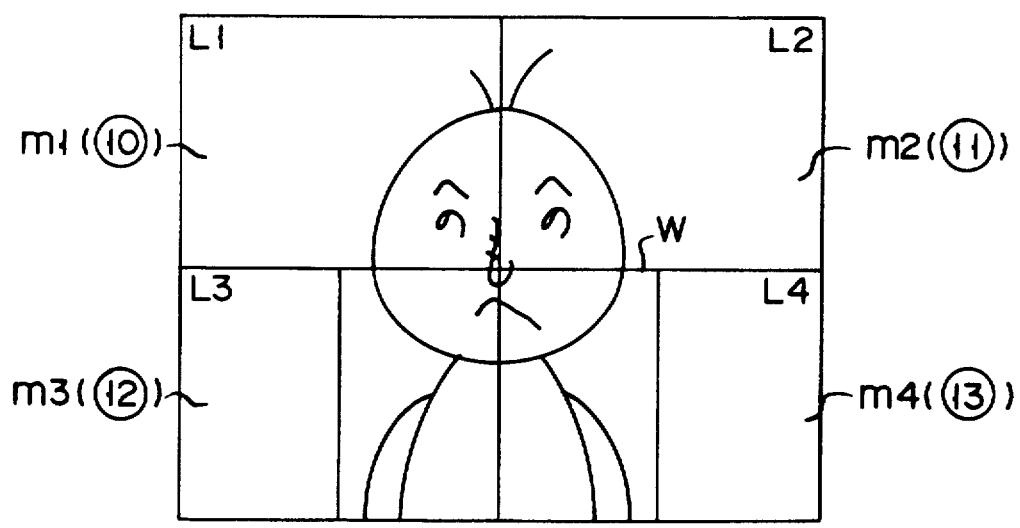
Figure 9C:
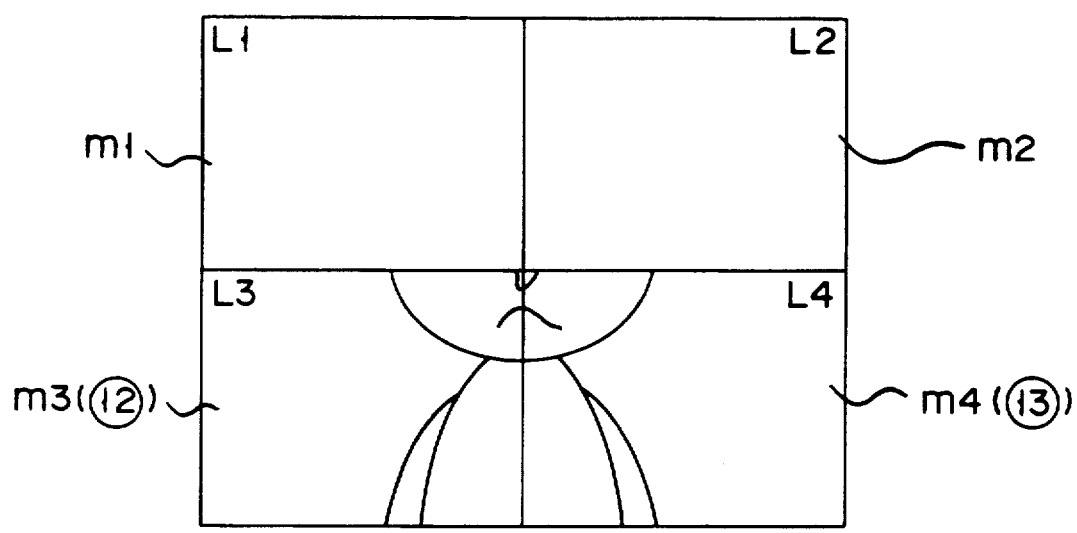

Assume that window W reaches the lower end of the logical image, in accordance with the operation described above, as shown in FIG. 9B. In this case, boundary-check and address-translation table controller 103 discriminates window-operation signal 106 from controller 4 and frame memory logical address 107 from window controller 101, and detects that window W has reached the lower end of the boundary. At this time, the flow in FIG. 6A is initiated. A direction for boundary condition is checked (S10 in FIG. 6A). In the case of FIG. 9B, the boundary condition is defined at the lower end of the boundary, and the flow advances to step S12. Controller 103 outputs address-translation data 109 to unit 102, to make available the physical page addresses corresponding to the upper half logical page addresses L1 and L2 with respect to image data in frame memory 3. In the case of FIG. 9B, the address-translation table is set in a state shown in FIG. 7A, so that frame memory physical page addresses m1 and m2 become available. By this operation, the logical image in frame memory 3 is converted to a state such as that shown in FIG. 9C. Subsequently, data 109 is output again, to reallocate frame memory 3 (S19). In the case of FIG. 9B, since the operator wishes to observe the lower portion below the displayed image, upper half logical page addresses L1 and L2 are assigned to physical page addresses m3 and m4 corresponding to the lower half logical page addresses L3 and L4. Addresses L3 and L4 are assigned to available physical page addresses m1 and m2, respectively. Thus, the frame memory physical/ logical page address-conversion table in FIG. 7A is reallocated, as shown in FIG. 7B. After the above operation, interrupt/status signal 105 is output to controller 4. The image data below the displayed image data is input at physical page addresses m1 and m2 corresponding to logical page addresses L3 and L4, according to the flow of FIG. 6B.

Figure 9D:
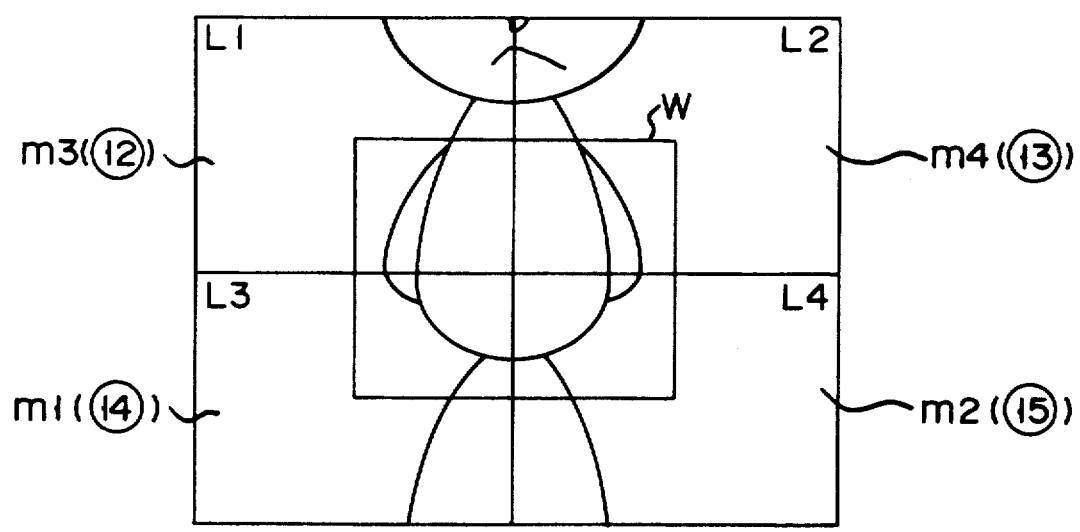

Controller 4 detects, in response to signal 105, that the direction of the boundary condition is the lower direction (S21 in FIG. 6B). Physical page addresses ⑭ and ⑮ , in optical disk 6, of image data corresponding to cells 5 and 6, are obtained, based on data shown in FIG. 8, from page-link memory 2 (S22). Subsequently, controller 4 designates optical disk controller 5 to read out image data at the designated address. Controller 5 outputs L3 and L4, as frame memory logical addresses 107, to address-translation unit 102, and image data 108 at addresses ⑭ and ⑮ of optical disk 6, is written in memory 3 (S23 and S24). Image data representing the image data below the displayed image data is loaded at addresses m1 and m2 corresponding to addresses L3 and L4. The image data structure in frame memory 3 is illustrated in FIG. 9D. In this state, the image data below the displayed image data can be freely output, by using window W.

As is described above, when the boundary condition for the lower end is detected, the physical addresses corresponding to upper half logical addresses L1 and L2 are made available. L1 and L2 are then assigned to physical addresses corresponding to lower half logical addresses L3 and L4. The lower half image data can be shifted to the upper half location of the screen without transferring data between pages, in frame memory 3. The image data of the lower direction can be automatically loaded from optical disk 6 by memory 2, to a memory area at logical addresses L3 and L4.

The above operation is performed when the boundary condition for the lower end is generated upon shifting of window W. The conversion table (FIGS. 7A and 7B) in address-translation unit 102 is updated in step S11 and steps S13 to S18, in FIG. 6A, when the boundary condition for the upper end, the left end, the right end, the upper left end, the upper right end, the lower left end, and the lower right end is detected, thereby reallocating frame memory 3.

According to this embodiment described above, the frame memory consists of four pages, and an arbitrary area between the pages is designated by the window, and the desired image data portion is displayed or printed. Even if the boundary condition for the frame memory is generated, the relationship between the logical page addresses on the image data and the actual physical page addresses in the frame memory, is rearranged to quickly shift the image data. The image data in the direction for the boundary condition can be automatically loaded from the optical disk, by use of the page link memory. A frame memory of a small capacity can allow an output of large image data such as a map.

In the above embodiment, the frame memory consists of four pages, and data is transferred in units of pages. However, the data need not be transferred in units of pages. But, if the frame memory has a larger capacity than one page, image data may be loaded from the optical disk, in predetermined data units.

The image data storage medium is not limited to the optical disk but can be extended to other storage means, such as a magnetic disk and a CDROM.

According to the present invention, the page link memory allows quick, accurate accessing of image data in a direction across the adjacent pages.

Furthermore, the dynamic reallocation function of the frame memory is added, so that minimum data transfer is allowed upon generation of the boundary condition of the frame memory.

High-speed window shifting can be performed, and the image data crossing adjacent pages can be output. Therefore, the man-machine interface can be greatly improved, and the number of hard copies to be output can be reduced.

What is claimed is:

1. An image data output apparatus, comprising:

image data storage means for storing image data representing a large image of a certain area;

image data storage controller means coupled to said image data storage means, for dividing the image data of the large image of said certain area into a given number of sets of partial image data, each of which sets corresponds to a different partial image area of predetermined size smaller than said large image of said certain area, and including means for storing the image data in units of the number of sets of partial image data at determined locations in said image data storage means;

page link memory means for storing connecting data representing image connecting relationships among each of said sets of partial image data for enabling the image data of said large image to be reproduced from connected ones of said sets of partial image data by an output device;

frame memory means for storing image data corresponding to a plurality of sets of partial image data stored in said image data storage means, said plurality of sets together representing adjacent partial image areas of said large image wherein the image areas when connected have end boundaries;

output range designation means for arbitrarily designating a window area range of image data to be reproduced by the output device from the image data corresponding to the plurality of sets of partial image data stored in said frame memory means; and control means coupled to said image data storage controller means, said page link memory means, said frame memory means and said output range designation means, including means for reading out end boundary adjacent image data representing a correct connecting relationship among the sets of partial image data from said image data storage means in accordance with the connecting data in said page link memory means when a designated window area range reaches an end boundary among the sets of partial image data in said frame memory means, and reallocation means for storing the readout end boundary adjacent image data in said frame memory means in place of part of current image data stored in said frame memory means;

wherein only those sets of partial image data stored in said image data storage means which are necessary for reproduction in the designated window area range of the large image, are allocated in said frame memory means.

2. An image data output apparatus according to claim 1, wherein said output range designation means includes means for designating the window area range in units of sets of partial image data each corresponding to an area not more than a size of one page.

3. An image data output apparatus according to claim 1, wherein said reallocation means of said control means includes means for storing image data corresponding to a plurality of partial image areas each of a one-page size, in said frame memory means.

4. An image data output apparatus according to claim 1, wherein said adjacent image data reading out means of said control means reads out image data representing a correct two-dimensional connecting relationship among said sets of partial image data stored in said image data storing means.

* * * * *